US006977050B1

(12) United States Patent
Viswanathan

(10) Patent No.: US 6,977,050 B1
(45) Date of Patent: Dec. 20, 2005

(54) SYNTHESIS OF LIGNOSULFONIC ACID-DOPED POLYANILINE USING TRANSITION METAL ION CATALYSTS

(75) Inventor: Tito Viswanathan, Little Rock, AR (US)

(73) Assignee: Polyone Corporation, Avon Lake, OH (US)

( * ) Notice: Subject to any disclaimer, the term of this patent is extended or adjusted under 35 U.S.C. 154(b) by 0 days.

(21) Appl. No.: 10/819,546

(22) Filed: Apr. 7, 2004

Related U.S. Application Data

(60) Provisional application No. 60/461,313, filed on Apr. 7, 2003.

(51) Int. Cl.[7] .......................... H01B 1/00; C21B 11/00
(52) U.S. Cl. ...................... 252/500; 528/214; 528/422; 75/721; 75/744
(58) Field of Search ........................ 252/500; 528/210, 528/214, 422; 525/54.1; 75/721, 744

(56) References Cited

U.S. PATENT DOCUMENTS

| | | | |
|---|---|---|---|
| 3,546,155 A | 12/1970 | Chandler | |
| 3,748,172 A | 7/1973 | Speirs et al. | |
| 3,862,851 A | 1/1975 | Speirs et al. | |
| 4,009,131 A | 2/1977 | Farone | |
| 4,048,136 A | 9/1977 | Kobayashi et al. | |
| 4,086,153 A | 4/1978 | Ariga et al. | |
| 4,130,469 A | 12/1978 | McGinnies | |
| 4,140,816 A | 2/1979 | McGinnies | |
| 4,163,810 A | 8/1979 | McGinnies | |
| 4,518,726 A | 5/1985 | Kato et al. | |
| 5,069,820 A | 12/1991 | Jen et al. | |
| 5,160,457 A | 11/1992 | Elsenbaumer | |
| 5,217,649 A | 6/1993 | Kulkarni et al. | |
| 5,274,021 A | 12/1993 | Geeck et al. | |
| 5,281,363 A | 1/1994 | Shacklette et al. | |
| 5,290,483 A | 3/1994 | Kulkarni et al. | |
| 5,456,862 A | 10/1995 | Kwan-Yue et al. | |
| 5,532,025 A | 7/1996 | Kinlen et al. | |
| 5,567,355 A | 10/1996 | Wessling et al. | |
| 5,645,890 A | 7/1997 | MacDiarmid et al. | |
| 5,648,416 A | 7/1997 | Miller et al. | |
| 5,658,649 A | 8/1997 | Wrobleski et al. | |
| 5,853,462 A | 12/1998 | Spellane et al. | |
| 5,853,621 A | 12/1998 | Miller et al. | |
| 5,871,671 A | 2/1999 | Kinlen et al. | |
| 5,968,417 A | 10/1999 | Viswanathan | |
| 5,976,419 A | 11/1999 | Hawkins et al. | |
| 6,059,999 A | 5/2000 | Viswanathan | |
| 6,231,789 B1 | 5/2001 | Hawkins et al. | |
| 6,299,800 B1 | 10/2001 | Viswanathan | |
| 6,440,332 B1 | 8/2002 | Geer et al. | |
| 6,569,651 B1 * | 5/2003 | Samuelson et al. | 435/128 |
| 6,627,117 B2 | 9/2003 | Geer et al. | |
| 6,764,617 B1 * | 7/2004 | Viswanathan et al. | 252/500 |

(Continued)

FOREIGN PATENT DOCUMENTS

| | | |
|---|---|---|
| DE | 28 54 696 | 7/1980 |

(Continued)

*Primary Examiner*—Mark Kopec
(74) *Attorney, Agent, or Firm*—John H. Hornickel; John M. Skeriotis

(57) ABSTRACT

The present invention relates to a method of synthesizing lignosulfonic acid-doped polyaniline by oxidatively polymerizing aniline in the presence of transition metal ions selected from the group consisting of Ag(I), Fe(II), and Fe(III) salts. The present invention also relates to a method for the preparation of transition metals from transition metal salts by exposing transition metal ion containing materials to an aqueous dispersion of lignosulfonic acid-doped polyaniline.

3 Claims, 6 Drawing Sheets

Potential profile of A) silver nitrate catalyzed HMSA-PANi, B) ferrous sulfate heptahydrate catalyzed HMSA-PANi, and C) HMSA-PANi (no catalyst).

U.S. PATENT DOCUMENTS

2002/0195592 A1 12/2002 Geer et al.

FOREIGN PATENT DOCUMENTS

| | | |
|---|---|---|
| GB | 1494212 | 12/1974 |
| JP | 59075943 | 4/1984 |
| JP | 7103185 | 4/1995 |
| JP | 08277370 | 10/1996 |
| WO | WO-99/64524 | 12/1999 |

* cited by examiner

Table 1. Times required for an observable color change and the conductivity of HMSA-LP for various transition metal salt catalysts.

| Transition Metal Salt | Time required for color change (min) | Conductivity (S/cm) |
|---|---|---|
| $CuSO_4 \cdot 5H_2O$ | 245 | 9.8 |
| $Ce(NO_3)_3 \cdot 6H_2O$ | 225 | 11.1 |
| $Co(NO_3)_2 \cdot 6H_2O$ | 225 | 9.8 |
| $Cu(NO_3)_2 \cdot 2.5H_2O$ | 210 | 6.7 |
| CuBr | 135 | 9.2 |
| No Catalyst | 130 | 10.8 |
| $FeCl_3 \cdot 6H_2O$ | 30 | 9.7 |
| $Fe(NO_3)_3 \cdot 6H_2O$ | 30 | 11.8 |
| $FeCl_2 \cdot 4H_2O$ | 15 | 10.7 |
| $FeSO_4 \cdot 7H_2O$ | 15 | 9.0 |
| $AgNO_3$ | 10 | 9.9 |

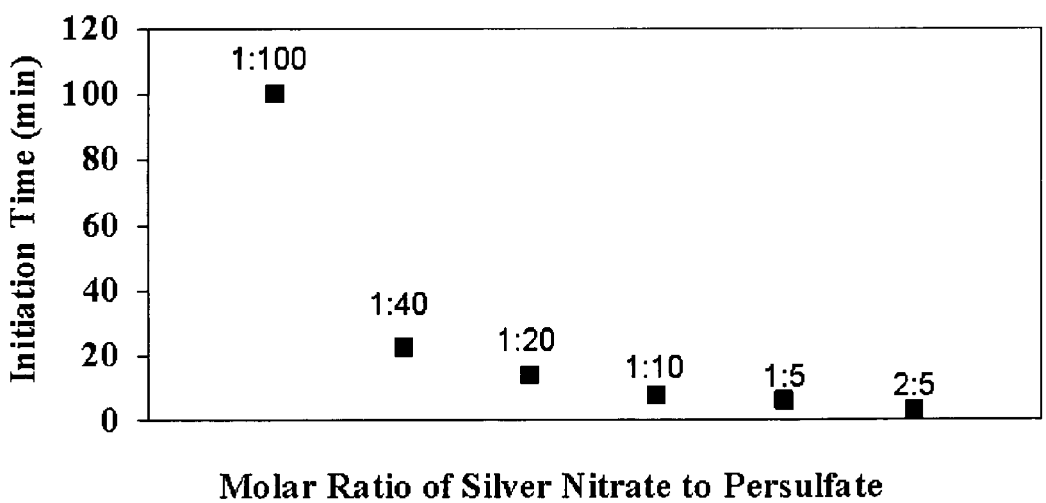

Figure 1 Initiation times for HMSA-LP as a function of molar ratio silver nitrate to sodium persulfate.

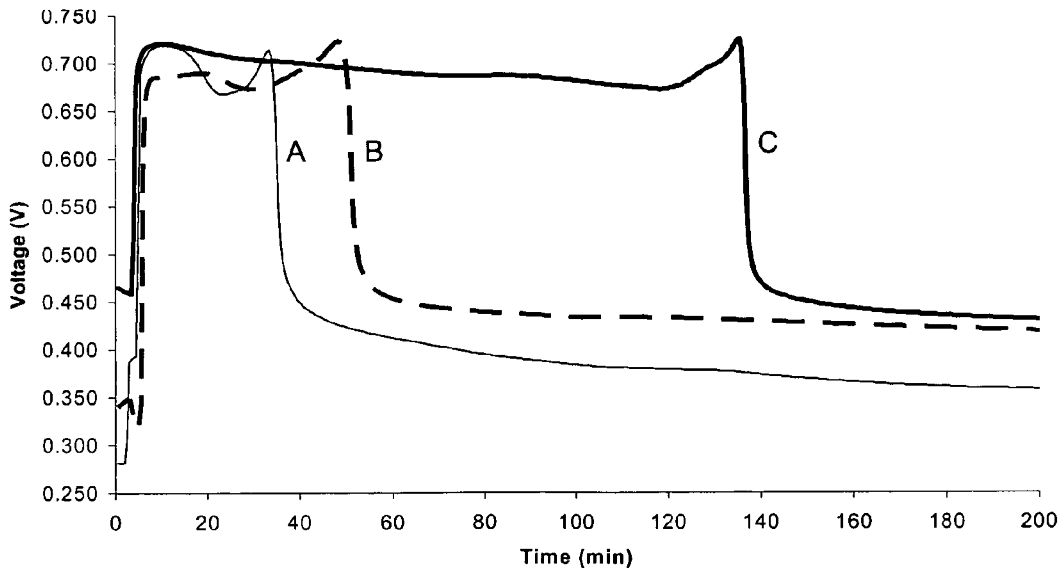
Figure 2 Potential profile of A) silver nitrate catalyzed HMSA doped LIGNO-PANI, B) ferrous sulfate heptahydrate catalyzed HMSA doped LIGNO-PANI, and C) HMSA doped LIGNO-PANI (no catalyst).

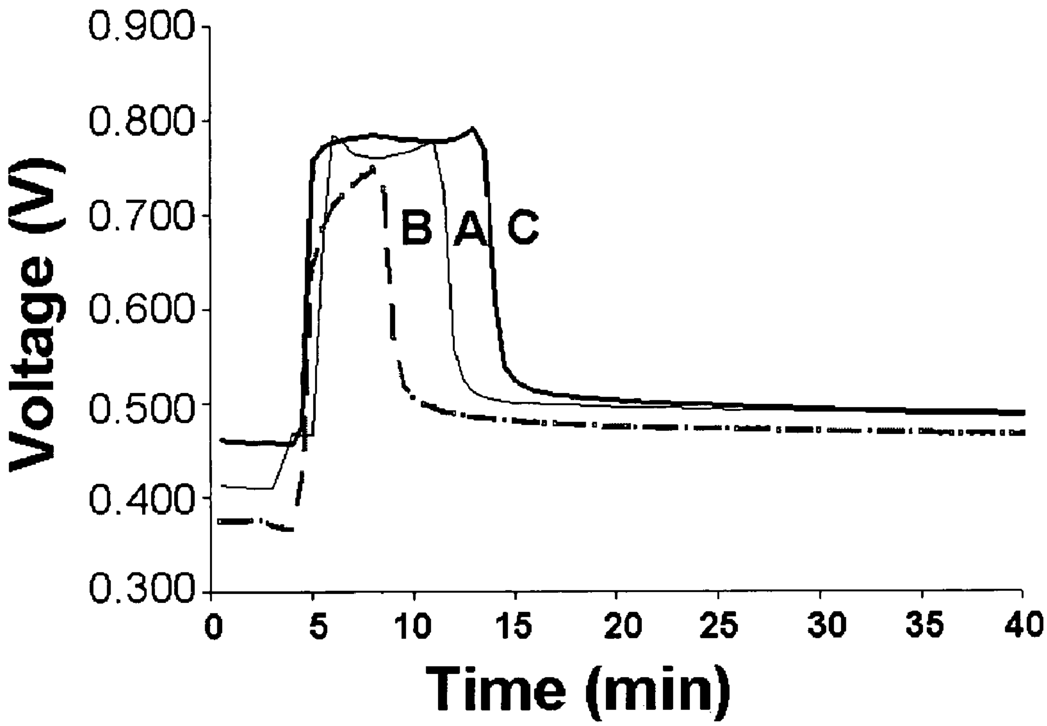
Figure 3 Potential profile of A) silver nitrate catalyzed HMSA-PANi, B) ferrous sulfate heptahydrate catalyzed HMSA-PANi, and C) HMSA-PANi (no catalyst).

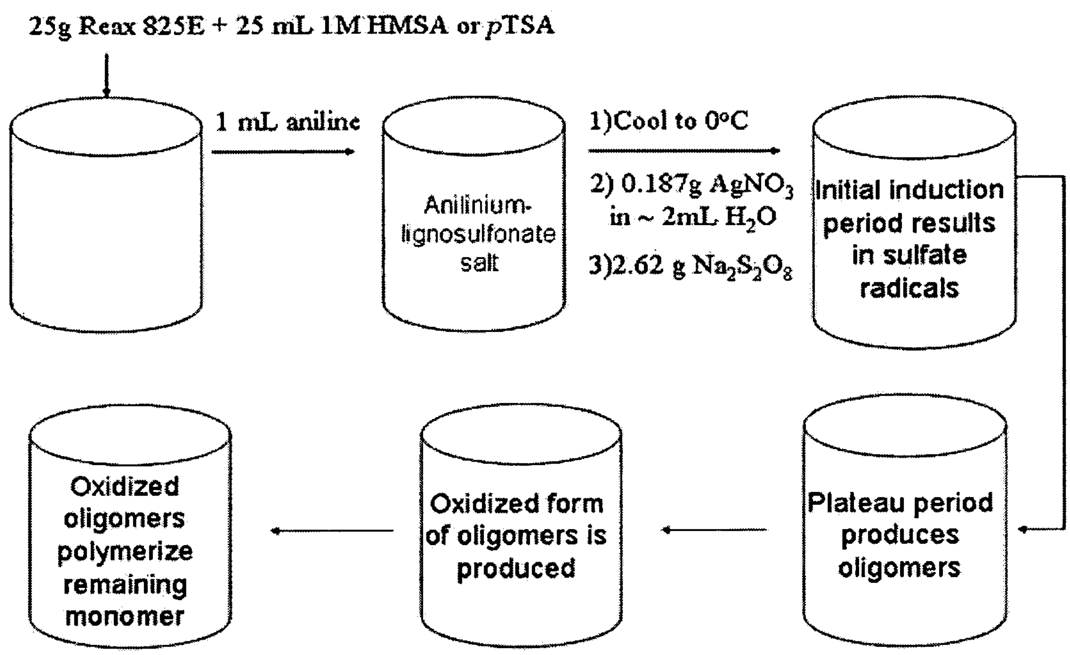
Figure 4 Flow diagram depicting the overall reaction including the different species thought to be formed during the course of the reaction

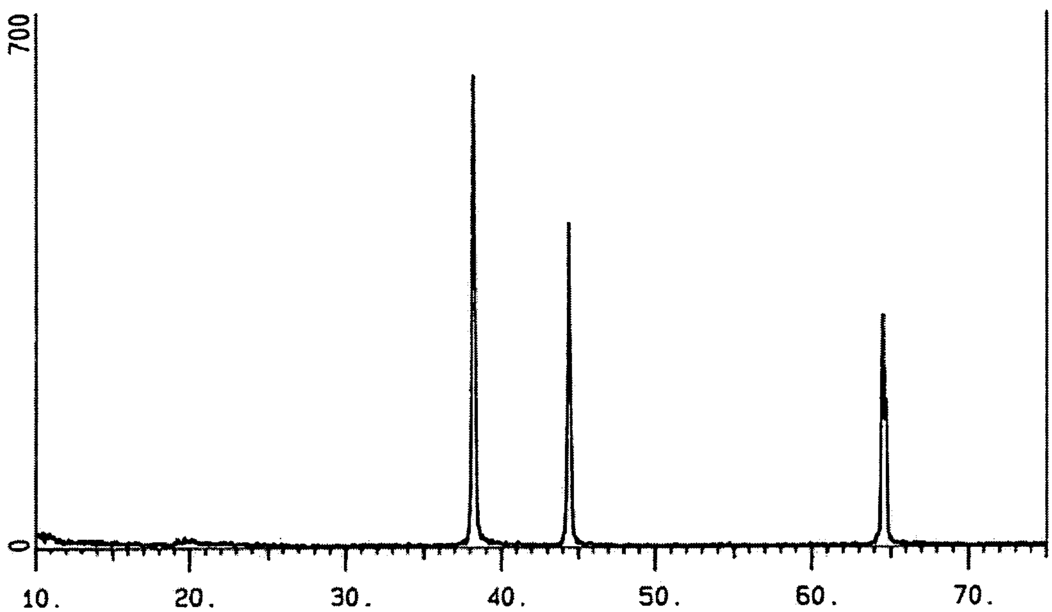
Figure 5 X-ray diffraction pattern of the silver precipitate formed (obtained after decantation of the reaction mixture) in the reaction vessel during the synthesis of ligno-pani in the presence of silver nitrate
silver nitrate

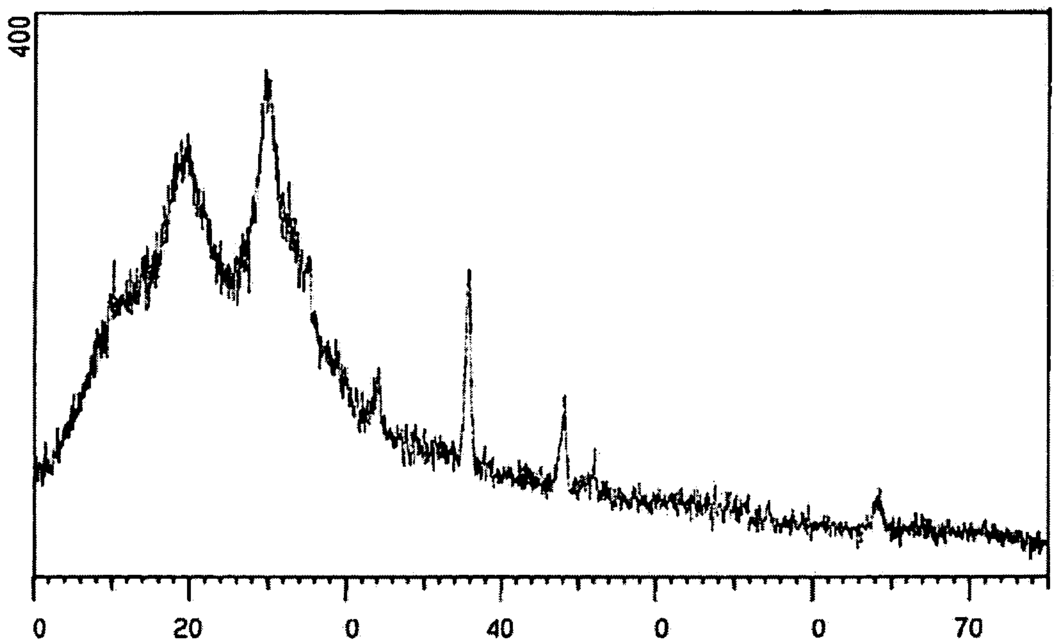
Figure 6 Powder X-ray diffraction pattern of the silver species remaining in the product after filtering and drying in the synthesis of ligno-pani in the presence of silver nitrate

SYNTHESIS OF LIGNOSULFONIC ACID-DOPED POLYANILINE USING TRANSITION METAL ION CATALYSTS

CLAIM OF PRIORITY

This patent application claims priority from provisional patent application, Ser. No. 60/461,313, filed on Apr. 7, 2003.

FIELD OF THE INVENTION

The present invention is broadly concerned with an improved synthesis of lignosulfonic acid-doped polyaniline (LIGNO-PANI) through the use of certain transition metal ion catalysts. More particularly, this invention is concerned with synthesizing additionally doped LIGNO-PANI possessing the property of a low initiation time of polymerization through the use of the aforementioned transition metal ions as catalysts.

BACKGROUND OF THE INVENTION

Lignosulfonic acid-doped polyaniline (LIGNO-PANI) is an important polymer having wide utility in a variety of applications due to its dispersibility in water, isopropyl alcohol and aqueous rich solvent mixtures and resins. The dispersibility is attributed to the presence of the bulky water-soluble lignosulfonate counter ion, however conductivity is sacrificed for dispersibility when using LIGNO-PANI. Therefore, additional dopants are necessary to increase conductivity. When additional dopants such as hydrochloric acid, para-toluenesulfonic acid (p-TSA) and methanesulfonic acid (HMSA) are used to increase conductivity, initiation time of bulk polymerization becomes prohibitively long. LIGNO-PANI without the additional dopant does not result in a prohibitively long initiation time but high conductivity values are sacrificed. A considerable need exists in the art for the synthesis of additionally doped LIGNO-PANI that retains the advantages of wide dispersibility and high conductivity without the negative consequence of a high initiation time of bulk polymerization.

SUMMARY OF THE INVENTION

The present invention provides a method of synthesizing a conductive and dispersible LIGNO-PANI additionally doped with different protonic acids through the use of certain transition metal ion catalysts to decrease initiation time during the polymerization process. In other words, the present invention relates to a method of synthesizing lignosulfonic acid-doped polyaniline comprising oxidatively polymerizing aniline in the presence of transition metal ions selected from the group consisting of Ag(I), Fe(II), and Fe(III) salts. The present invention also relates to a method for the preparation of transition metals from transition metal salts comprising exposing transition metal ion containing materials to an aqueous dispersion of lignosulfonic acid-doped polyaniline.

BRIEF DESCRIPTION OF THE DRAWINGS

The features and advantages of the present invention will become more readily apparent from the following detailed description of the invention in which: Table 1 compares the reaction times during polymerization of various transition metal salt catalysts;

FIG. 1 shows the initiation time for HMSA-LP as a function of molar ratio of silver nitrate to sodium persulfate;

FIG. 2 shows the potential profiles of LIGNO-PANi additionally doped with HMSA using both silver nitrate and ferrous sulfate heptahydrate as catalysts as well as the control using no catalyst;

FIG. 3 shows the potential profiles of PANI doped with HMSA using both silver nitrate and ferrous sulfate heptahydrate as catalysts as well as the control using no catalyst;

FIG. 4 depicts a flow diagram of the overall reaction of the present invention;

FIG. 5 shows the powder X-ray diffraction pattern for the silver precipitate formed in the reaction vessel; and FIG. 6 shows the powder X-ray diffraction pattern for the silver species remaining in the product after filtering and drying.

DETAILED DESCRIPTION OF THE INVENTION

The discovery of electrically conducting conjugated polymers as a subset of inherently conducting polymers (ICPs) has sparked increased research due to the conductive nature of these polymers. (See Shirakawa, Hideki; Louis, Edwin J.; MacDiarmid Alan G.; Chiang, Chwan K.; Heeger, Alan J. *J. Chem. Soc. Chem. Commun.,* 1977, 578). Of the electrically conducting conjugated ICPs, PANi has been widely studied with application in a wide variety of fields because it is relatively easy and inexpensive to synthesize. Unfortunately, a major drawback to the versatility of using PANI is its insolubility in water and most organic solvents (Gregory, Richard V. Chapter 18*: Solution Processing of Conductive Polymers: Fibers and Gels from Emeraldine Base Polyaniline in Handbook of Conducting Polymers*, Eds. Skotheim, Terje A.; Elsenbaumer, Ronald L.; Reynolds, John R.; Marcel Dekker Inc., 1998; p. 437). The insolubility of the PANi polymer is an inevitable by-product of its electrical conductivity because the PANi polymer becomes electrically conducting when doped with protonic acids such as hydrochloric acid, sulfuric acid, para-toluenesulfonic acid, and ethane sulfonic acid. The acidic doping however causes PANi to becomes highly insoluble and non-processible. Therefore, dispersibility is sacrificed for conductivity.

Lignosulfonic acid doped polyaniline (LIGNO-PANI) (Viswanathan, T. "Conducting Compositions of Matter", U.S. Pat. No. 6,299,800 (2001)) is therefore, an important polymer because it is one of the only water- and solvent-dispersible polyanilines commercially available on a mass scale. This polymer is dispersible in water, isopropyl alcohol and aqueous rich solvent mixtures and resins due the presence of the bulky water-soluble lignosulfonate counter ion. (See Tito Viswanathan, U.S. Pat. Ser. No. 60,249,563, filed Jul. 11, 2001, and related material by B. C. Berry, A. U. Shaikh and T. Viswanathan, Chapter 12, "LIGNO-PANI for the corrosion prevention of cold rolled steel" pp. 182–195 (2003) in ACS Symposium series 843 on the Electroactive polymers for corrosion control, Eds. Peter Zarras et al, American Chemical Society, Washington, D.C.). Furthermore, incorporation of the lignosulfonate macromolecule provides the aforementioned dispersibility without significantly decreasing the conductivity (3–4 S/cm). (See U.S. Pat. No. 5,968,417 (1999); U.S. Pat. No. 6,059,999; and U.S. Pat. No. 6,299,800 (2001)).

The synthesis of LIGNO-PANI involves the polymerization of aniline in the presence of lignosulfonic acid using an oxidizing agent such as ammonium or sodium persulfate. (See U.S. Pat. No. 5,968,417 (1999); U.S. Pat. No. 6,059, 999; and U.S. Pat. No. 6,299,800 (2001)). Additionally, this synthesis is commercially and environmentally desirable because lignin is a readily available by-product of the paper industry.

As noted above, PANi with other dopants such as hydrochloric acid, para-toluenesulfonic acid (p-TSA) and methanesulfonic acid (HMSA) is extremely insoluble and incompatible with both water and organic resins such as those used in the coating industry, however, the doping is needed in order to impart conductive properties upon the polymer. LIGNO-PANI is similarly not very conductive without additional doping, and in fact, additional doping is required to improve conductivity. Studies have shown these additional dopants also improve compatibility in host solvents and resins (See Hopkins, Alan R.; Rasmussen, Paul G.; Basheer, Rafil A. *Macromolecules* 1996, 29, 7838–7846). Although the use of LIGNO-PANI overcomes the problem of dispersibility, incorporating certain additional dopants in situ (with lignosulfonates) increases initiation time such that polymerization process is prohibitively long (anywhere from 40 minutes to several hours). Increasing temperature does generally decrease initiation time but this mechanism is undesirable because it may lead to unwanted side reactions making use of the polymer in the thermoplastics industry impossible. A considerable need exists in the art for the synthesis of additionally doped LIGNO-PANi that possesses high dispersibility, high conductivity, and shorter initiation period for polymer formation during the process of its synthesis.

The invention of the present application presents a great advance in the art by using certain transition metal ion catalysts to synthesize additionally doped LIGNO-PANI that possesses a short initiation period in addition to possessing high dispersibility and conductivity. The description below demonstrates the novel synthesis of LIGNO-PANI using certain transition metal ion catalysts. In particular the novel advance presented by this invention is the recognition that using certain salts of Ag(I), Fe(II), and Fe(III) ions in catalytic quantities dramatically reduce initiation time of the additionally doped LIGNO-PANI polymer during bulk polymerization without sacrificing conductivity or dispersibility. The molar ratio of the metal ions to persulfate in the instant invention is preferably from about 1:100 to 1:1, more preferably from about 1:100 to 2:5, and most preferably 1:10.

Silver in its various transition states has been used in the art as a catalyst for a variety of reactions. In particular, the use of Ag(I) as a catalyst in the presence of peroxidisulfate for the decarboxylation of carboxylic acid has been studied extensively (See Anderson, James M.; Kochi, Jay K. *J. of Amer. Chem. Soc.* 1970, 92(6), 1651–1659). The Ag(II) ion has also been shown to form reactive intermediates during reactions involving peroxidisulfate. (See Anderson, James M.; Kochi, Jay K. *J. of Amer. Chem. Soc.* 1970, 92(6), 1651–1659; Anderson, James M.; Kochi, Jay K. *J. of Org. Chem.* 1970, 35(4), 986–989). In addition the Ag (III) ion formed from a $2e^-$ transfer in the dissociation of persulfate may be stabilized by the formation of complexes. These complexes have been shown to possess oxidative capabilities in the decarboxylation of acids (See Anderson, James M.; Kochi, Jay K. *J. of Org. Chem.* 1970, 35(4), 986–989).

Fe(II) is also a known catalyst in the art. Principles of chemistry teach that transition metals having similar redox potentials possess similar catalytic properties, however, this invention provides a great advance in the art because it has been found that other transition metal ions do not in fact possess these suggested catalytic properties. A variety of transition metal cations (silver, ferrous, ferric, cobalt(II), cerium (III) and copper(II)) with different anions (chloride, nitrate, sulfate and bromide) were tested as potential catalysts for the synthesis of LIGNO-PANI in the presence of HMSA. (See Table 1). The results of Table 1 (discussed in more detail below) demonstrate that although general scientific principles suggest the transition metal ions should possess similar catalytic properties, silver nitrate (Ag (I)) and ferrous ions (Fe(II)) possessed superior catalytic properties. The superiority of silver nitrate followed by ferrous ions presents unexpected results that also operate against the fundamental teachings of the chemistry as dictated by the periodic table. In fact, the variability of the effectiveness of the transition metals is not yet fully understood in the art.

The following non-limiting example and accompanying discussion of the results thereof demonstrates the advance in the art and the manner in which the problems discussed herein were addressed.

It should be noted in the offset that the weight percent ratio of lignosulfonate to aniline is preferably from about 1:8 to 1:1, and more preferably 1:4. The ratio of lignosulfonate to aniline described in the example herein is the optimal 1:4 ratio. LIGNO-PANI with methanesulfonic acid (HMSA) as an additional dopant (HMSA-LP) was synthesized by dissolving 0.25 g of sodium lignosulfonate (Reax 825E from Westvaco) in 25 mL of 1M HMSA. One milliliter (0.011 moles) of distilled aniline was then added to the reaction mixture. The reaction was cooled to ~0° C. This temperature range can preferably vary from about −10° C. to 35° C. Then, 0.0011 mol. of the different metal salts dissolved in water was added followed by 2.62 g (0.011 moles) of sodium persulfate (Aldrich). The reaction was carried out overnight and then vacuum filtered through a Whatman #4 filter paper. The wet cake was washed with water until the filtrate was clear. Two successive washings of the cake with 1M HMSA were performed. The cake was dried under vacuum.

A two-electrode system was employed for the electrochemical measurements discussed herein. A glassy carbon electrode was used as the working electrode and a silver-silver chloride electrode (SSCE) was used as the reference. In order to ensure that the polymerization products did not affect the porosity of the frit, the SSCE was placed in a separate vessel containing a saturated KCl solution and connected to the system via a Luggin capillary capped with a semi-permeable membrane. The electrodes were connected to an EG&G PAR 283 potentiostat. The software used to collect the data was an open circuit monitoring program within the SoftCORR corrosion measurement software. Potential measurements were collected at 30-second intervals starting 5 minutes before the addition of persulfate. The reactions were monitored for a total of 24 hrs.

Conductivity values were obtained for pressed pellets (pressed at 20,000 psi for 1 minute with 1.3 cm diameter, <1 mm thick) using an Alessi four-point conductivity probe connected to a Keithley electrometer and a Keithley programmable current source.

An analysis of residual metals was conducted on the dry samples with silver nitrate and ferrous sulfate heptahydrate were digested using $HCl/HNO_3$ in a CEM microwave digestion system. The metal content was analyzed using a Perkin-Elmer Optima 4310 DV ICP-0ES.

The results of the tests herein demonstrate that Ag(I), Fe(II), or Fe(III) ions reduce initiation time in the polymerization process when added in catalytic quantities. As discussed above, a variety of transition metal cations (silver, ferrous, ferric, cobalt(II), cerium (III) and copper(II)) with different anions (chloride, nitrate, sulfate and bromide) were tested as potential catalysts for the synthesis of LIGNO-PANI in the presence of HMSA (Table 1). The data in Table 1 demonstrates that among the transition metal salts, silver nitrate was superior in catalytic properties followed closely by ferrous salts. Table 1 lists the time required for the color to change to a deep green indicative of the formation of the emeraldine salt (note that doped PANi is an emeraldine salt) for several different transition metal salts. All reactions shown in Table 1 contain lignosulfonates and HMSA. The data shows that silver nitrate and ferrous salts reduced the time required for an observable color change dramatically while the other transition metal salts did not. It should be reiterated that the teaching in the art suggests that transition metals possessing similar redox potentials should have similar catalytic properties and the data in Table 1 demonstrates otherwise. Therefore, the effectiveness of Ag(I), Fe(II) and Fe(III) ions as catalysts in reducing initiation time for the bulk polymerization of additionally doped LIGNO-PANI is a truly unexpected result. The initiation time is preferably of from about 0–110 minutes, and more preferably of from about 1–100 minutes. (See FIG. 1)

FIG. 1 demonstrates that the optimal molar ratio of silver nitrate to persulfate was 1:10 for the catalysis of the synthesis of HMSA-LP. (See FIG. 1) FIG. 1 is a graph of the initiation time (followed by the onset of color change) for the reaction as a function of molar ratio of silver nitrate to persulfate. These data demonstrate that a 1:10 ratio is optimal since no significant decrease in initiation time is seen at higher ratios. (See FIG. 1).

FIGS. 2 and 3 respectively demonstrate the effects of silver nitrate and ferrous sulfate heptahydrate on the HMSA doped LIGNO-PANI reaction as compared to their effects on the HMSA-PANi reaction (i.e. with no lignosulfonate) via potential profile monitoring. The optimal molar ratio (1:10) discussed in connection with FIG. 1 immediately above was used to study the catalytic affects of both the silver nitrate and the ferrous sulfate heptahydrate by monitoring the reaction potential as a function of reaction time. It should be noted that although the optimal molar ratio was 1:10, the molar ratio could preferably vary from about 2:5 to 1:100. (See FIG. 1) Both silver nitrate and ferrous sulfate heptahydrate exhibited significant catalytic effects in the preparation of LIGNO-PANI. The potential profiles shown in FIGS. 2 and 3 provide the exact time of bulk polymerization. Previous studies of the electrochemical reaction of aniline polymerization have offered help in the dissection of these potential profiles (See Bourdo, Shawn E.; Berry, Brian C.; Viswanathan, T. *ACS PMSE Preprints,* 2002, 86, 159–160; Manohar, Sanjeev K. "Synthesis and Characterization of Polyaniline and Its Derivatives". Doctoral Thesis, University of Pennsylvania 1992, 73–80).

The first rise in potential can be labeled as the induction period during which time the sodium persulfate quickly dissociates to form sulfate radicals which oxidize the aniline species. The induction period is followed by a period known as the plateau period during which time the oxidized form of polyaniline (also known as pernigraniline) begins to form. During bulk polymerization the remaining aniline in solution is oxidized by pernigraniline to form polyaniline in the emeraldine state. The reduction of the pernigraniline to the emeraldine state results in a sharp decrease in potential.

When lignosulfonic acid alone (i.e., in the absence of additional dopant) is used as the dopant/template, the time required for the bulk solution to begin polymerization (~27 min.) is longer than traditional reactions such as the synthesis of HCl-PANi (~2–3 min.). The increase in time required for bulk polymerization may be acceptable since the product has superior processibility. A possible explanation for the increased time is the attraction of the anilinium salt for the polyaromatic lignosulfonate macromolecule which results in increased hindrance for reactive species to come together for a fruitful reaction. This may delay the formation of a dimer which has been shown to be the rate limiting step. In addition it is also known that lignosulfonates are radical scavengers (Nimz, Horst H. Chapter 5*: Lignin-Based Wood Adhesives in Wood Adhesives: Chemistry and Technology*, Ed. Pizzi, A. 1983; p. 263). This could result in a lower effective concentration of persulfate and therefore decrease the concentration of anilinium radical cations.

The time required for bulk polymerization of aniline in the presence of lignosulfonates with some additional dopants is prohibitively long (1130 min.). In addition to the steric hindrance imparted by the lignosulfonate previously discussed, the sulfonic acid groups of the additional dopants which are protonating the amine may further impede the oxidation of aniline. This has been supported by the increased time required for bulk polymerization when using HMSA or p-TSA is an additional dopant.

As indicated by the potential profiles, the addition of silver nitrate or ferrous sulfate heptahydrate shortens the plateau period significantly. This appears to support the idea that the metal cation is a more effective oxidant due to its smaller size. Building on ideas previously published by Fong et al, (Fong, Yoke; Schlenoff, Joseph B. *Polymer,* 36(3), 639–643 (1995)), Scheme 1 illustrates the mechanism by which the metal Scheme 1.

Proposed mechanism of metal catalyzed polymerization of aniline.

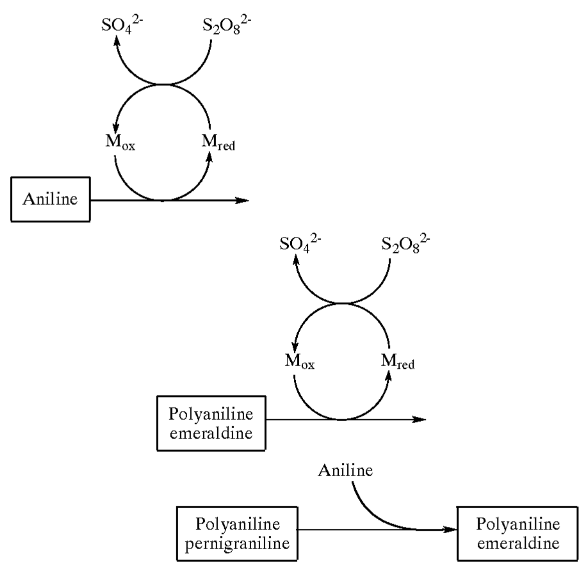

cation can act as an oxidant in the polymerization of aniline. As the persulfate dissociates, metal cations are converted to a higher oxidation state ($M_{ox}$). The cations ($M_{ox}$) begin to oxidize the aniline to dimers and/or oligomers resulting in a reduced form of the metal cation ($M_{red}$). $M_{ox}$ can be regenerated from $M_{red}$ via persulfate. Once the dimers or oligomers are present in the emeraldine state further oxidation can occur via $M_{ox}$, resulting in the pernigraniline species.

Once the persulfate is consumed, and the metal oxidant can no longer be regenerated, the remaining aniline in solution can be oxidized by the pernigraniline resulting in polyaniline in the emeraldine state. This mechanism of polymerization has been labeled reactivation chain polymerization by Wei [Wei, Yen. *J. Chem. Ed.* 78(4), 551–553 (2001)].

The effect of the metal salts on the polymerization of aniline in the absence of lignosulfonates have also been studied. The dopant used in this study was MSA, the same additional dopant used in the MSA-LP studies. As seen in the MSA-PANi reactions (FIG. 3), ferrous sulfate heptahydrate is more effective in decreasing the time for bulk polymerization than silver nitrate. The difference in catalytic effects also can be attributed to steric effects since the atomic radius of the iron ion is smaller than the silver ion. Although this is true, the ferrous sulfate heptahydrate did not exhibit better catalytic effects than silver nitrate in the synthesis of MSA-LP (FIG. 2). A possible reasoning is that lignosulfonates are known to easily form complexes with iron species. This would result in a lower concentration of free catalyst, affecting the time required to reach bulk polymerization.

At the end of the reactions catalyzed by silver nitrate, the formation of a silver species with a metallic sheen within the reaction vessel was visibly observed. Lignosulfonates contain o-methoxyphenol and ortho-catechol moieties that are known to complex metal species readily and aid in the recovery of metals from metal sulfate, nitrate, oxide, and other metal ion containing compounds (See Bourdo, Shawn E.; Berry, Brian C.; Viswanathan, T. *ACS PMSE Preprints,* 2002, 86, 159–160; Clough, Thomas J. "Precious Metal Recovery Process from Sulfide Ores", U.S. Pat. No. 5,344, 625 (1994)). The redox capability of the polyaniline chain also aids in the recovery of precious metals (Bourdo, Shawn E.; Berry, Brian C.; Viswanathan, T. *ACS PMSE Preprints,* 2002, 86, 159–160; Rajeshwar, Krishnan; Wei, Chang; Basak, Sanjay. "Redox polymer films for metal recovery application", U.S. Pat. No. 5,368,632 (1994)). It is anticipated that the use of lignosulfonate doped ICPs for precious metal recovery will be utilized.

In this regard, x-ray diffraction (XRD) was used to determine the nature of the Ag species observed at the end of the reactions. The XRD patterns in FIGS. 5 and 6 allow analysis of both the metal precipitate located in the bottom of the reaction vessel and if any silver metal or silver salts were being incorporated into the final product. The three major peaks observed in the precipitate correspond to the (111), (200), and (220) planes of metallic silver. The peaks present in the dry product correspond to Ag metallic as well as several different salt forms. The XRD pattern for the filtered and dried ICP indicates the presence of both silver salts and elemental silver. As the reaction proceeded for longer periods of time, it appeared that more silver was left in the polymer matrix. Also there is a dramatic difference between the amount of silver and iron in the respective products. Only trace amounts of iron was left in the final polymer matrix (<0.01%), while there is about 1.8% silver in the samples when the reaction is carried out for 24 hours. Because silver has a favorable reduction potential, it is more likely to exist in the elemental state although some may remain as the soluble silver nitrate salt. Iron, however, remains in the more stable Fe(II) state. Analysis of the residual metals was conducted using an inductively coupled plasma spectrometer.

All publications, patents, and patent documents are incorporated by reference herein, as though individually incorporated by reference. Although the invention has been described with reference to a specific and preferred embodiment and technique, it should be appreciated by one of skill in the art that many variations and modifications may be made within the scope of this invention.

What is claimed:

1. A method of synthesizing lignosulfonic acid-doped polyaniline comprising: oxidatively polymerizing aniline in the presence of lignosulfonic acid and transition metal ions selected from the group consisting of silver nitrate and ferrous sulfate.

2. A method for the preparation of transition metals from transition metal salts comprising: exposing transition metal ion containing materials to an aqueous dispersion of lignosulfonic acid-doped polyaniline, wherein the transition metal is selected from the group consisting of silver and gold.

3. The method of claim 2 further comprising the step of isolating the transition metal from the transition metal salt.

* * * * *